(12) United States Patent
Velez (10) Patent No.: US 11,806,856 B1
(45) Date of Patent: Nov. 7, 2023

(54) MOTORIZED MULTI-FUNCTION TOOL

(71) Applicant: MIRA SMART INVESTMENT, LLC, Naples, FL (US)

(72) Inventor: Rafael Velez, Naples, FL (US)

( * ) Notice: Subject to any disclaimer, the term of this patent is extended or adjusted under 35 U.S.C. 154(b) by 286 days.

(21) Appl. No.: 17/188,560

(22) Filed: Mar. 1, 2021

Related U.S. Application Data (63) Continuation-in-part of application No. 16/743,075, filed on Jan. 15, 2020, now Pat. No. 10,960,528.

(51) Int. Cl.
  *B25F 1/02* (2006.01)
  *B25F 3/00* (2006.01)
  *B25G 1/04* (2006.01)

(52) U.S. Cl.
  CPC .............. *B25F 1/02* (2013.01); *B25F 3/00* (2013.01); *B25G 1/04* (2013.01)

(58) Field of Classification Search
  CPC .............. B25G 1/04; B25F 1/02; B25F 3/00
  USPC .............................................................. 81/52
  See application file for complete search history.

(56) References Cited

U.S. PATENT DOCUMENTS

| 4,089,114 A | 5/1978 | Doolittle |
| 4,237,610 A | 12/1980 | Bradus |
| 2008/0196256 A1* | 8/2008 | Gieske ............... A01G 3/08 30/296.1 |
| 2009/0277313 A1* | 11/2009 | Wise ................ B25B 13/46 81/479 |
| 2016/0227694 A1* | 8/2016 | Bermudez .......... A01D 42/00 |
| 2018/0104809 A1* | 4/2018 | Dyer ............... B27B 17/0016 |
| 2018/0311807 A1* | 11/2018 | Sergyeyenko ....... H02J 7/0048 |

* cited by examiner

*Primary Examiner* — Tom Rodgers
(74) *Attorney, Agent, or Firm* — SANCHELIMA & ASSOCIATES, P.A.; Christian Sanchelima; Jesus Sanchelima (57) ABSTRACT

A motorized multi-function tool including a handle assembly, a cover assembly, a rod assembly and an interchangeable tool assembly is disclosed. The handle assembly includes a handle that allows a user to operate the motorized multi-function tool. Within the handle is a battery to power a motor located in the cover assembly. The handle assembly and the cover assembly have the rod assembly therebetween connecting them to one another. The rod assembly includes a shaft which allows the user to set the motorized multi-function tool at different lengths to accomplish distinct tasks. Importantly, the cover assembly has the interchange tool assembly which allow for changing of tool heads for different functions to accomplish different tasks. The different tool heads may be used for manual labor work or for health and beauty purposes as well.

7 Claims, 12 Drawing Sheets

MOTORIZED MULTI-FUNCTION TOOL

RELATED APPLICATIONS

The present application is a continuation-in and claims the benefit of the priority date of pending U.S. patent application Ser. No. 16/743,075 filed on Jan. 1, 2020, which is hereby incorporated by reference.

BACKGROUND OF THE INVENTION

1. Field of the Invention

The present invention relates to a motorized multi-function tool and, more particularly, to a motorized multi-function tool having interchangeable heads to permit completing of various tasks with one same tool.

2. Description of the Related Art

Several designs for motorized multi-function tools have been designed in the past. None of them, however, include an interchangeable cover assembly having a head that includes a motor therein. The heads are capable of achieving various tasks such as cutting or suctioning, for example. This allows a user to use one same tool to complete various necessary tasks at home or in a work environment. Further, there is a quick and easy change of heads for efficiency when working on various tasks.

Applicant believes that a related reference corresponds to U.S. Pat. No. 4,237,610 for a Portable, Electrically Energized, Cordless Grass Trimmer. Applicant believes another related reference corresponds to U.S. Pat. No. 4,089,114 for a Cutting Device. None of these references, however, teach of interchangeable heads for accomplishing various tasks such as cleaning or building with one same tool.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a motorized multi-function tool that has interchangeable heads.

It is another object of this invention to provide a motorized multi-function tool that is capable of multiple functions such as cleaning, drilling or sanitizing, for example.

It is still another object of the present invention to provide a motorized multi-function tool that is portable.

It is another object of the present invention to provide a motorized multi-function tool that can complete various tasks quickly.

It is also another object of the present invention to provide a motorized multi-function tool that is easy to operate.

It is yet another object of the present invention to provide a motorized multi-function tool that can help users reach hard to reach areas.

It is another object of the present invention to provide a motorized multi-function tool that allows for quick and easy changing of the interchangeable heads.

It is still another object of the present invention to provide a motorized multifunction tool that helps users address their cosmetic needs and concerns.

It is also an object of the present invention to provide a motorized multifunction tool that helps users improve their well-being.

It is another object of the present invention to provide a motorized multi-function tool that can be operated single handedly, permitting the user to better secure themselves to a location or object with their free hand for added safety.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed that it, a motorized multi-function tool 10, basically includes a handle assembly 20, a rod assembly 40, a cover assembly 60 and an interchangeable tool assembly 80.

Figure 1:
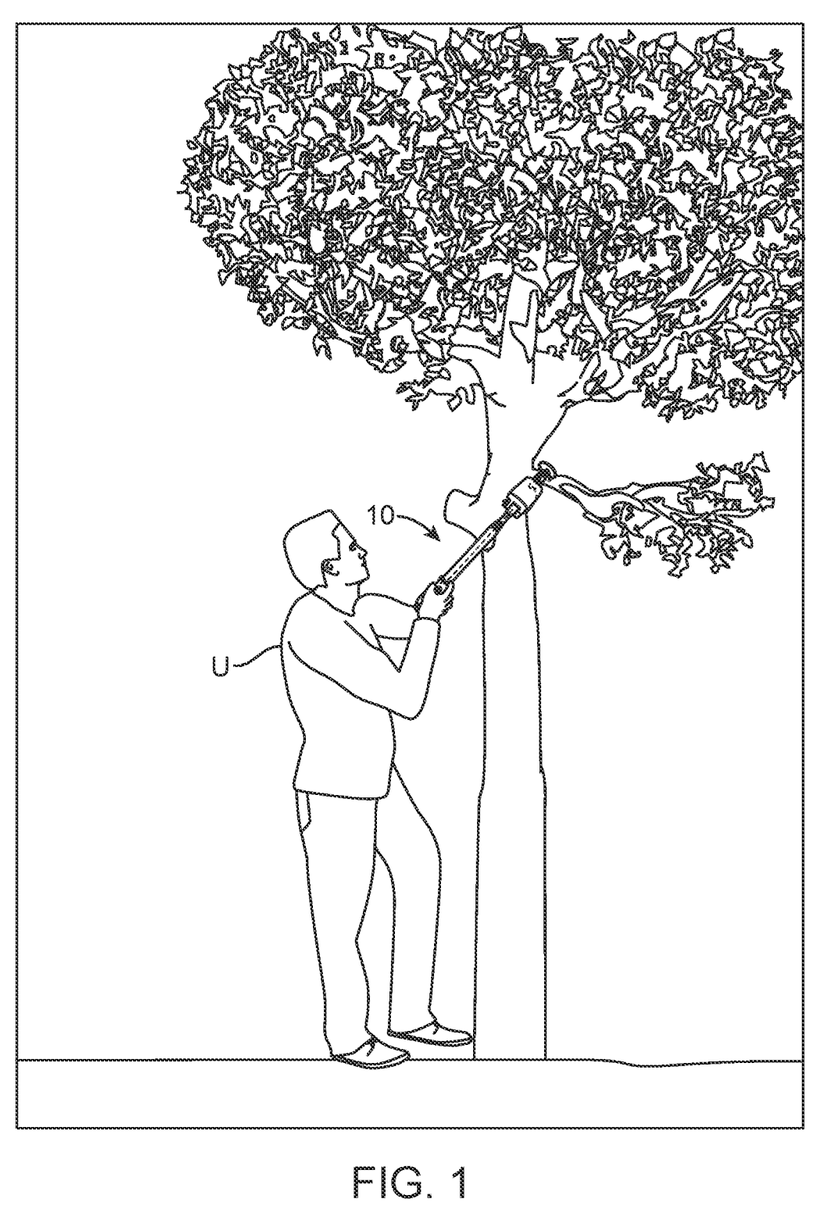
FIG. 1 represents the present invention, a motorized multi-function tool 10, in an operational setting.
Figure 2:
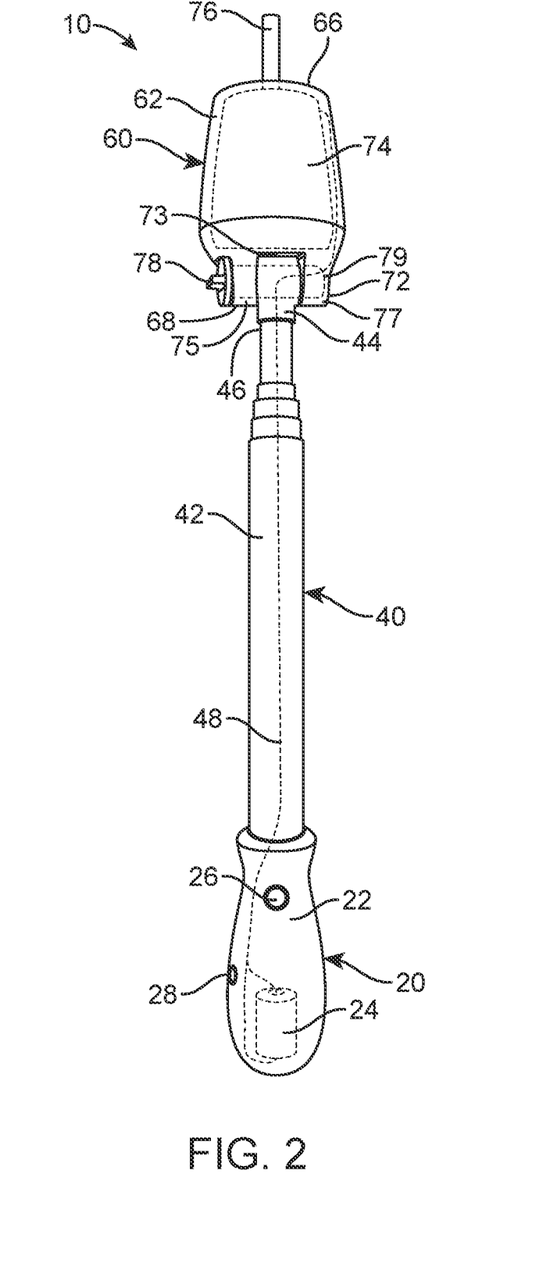
FIG. 2 shows an isometric view of the motorized multi-function tool 10 in a retracted configuration.
Figure 3:
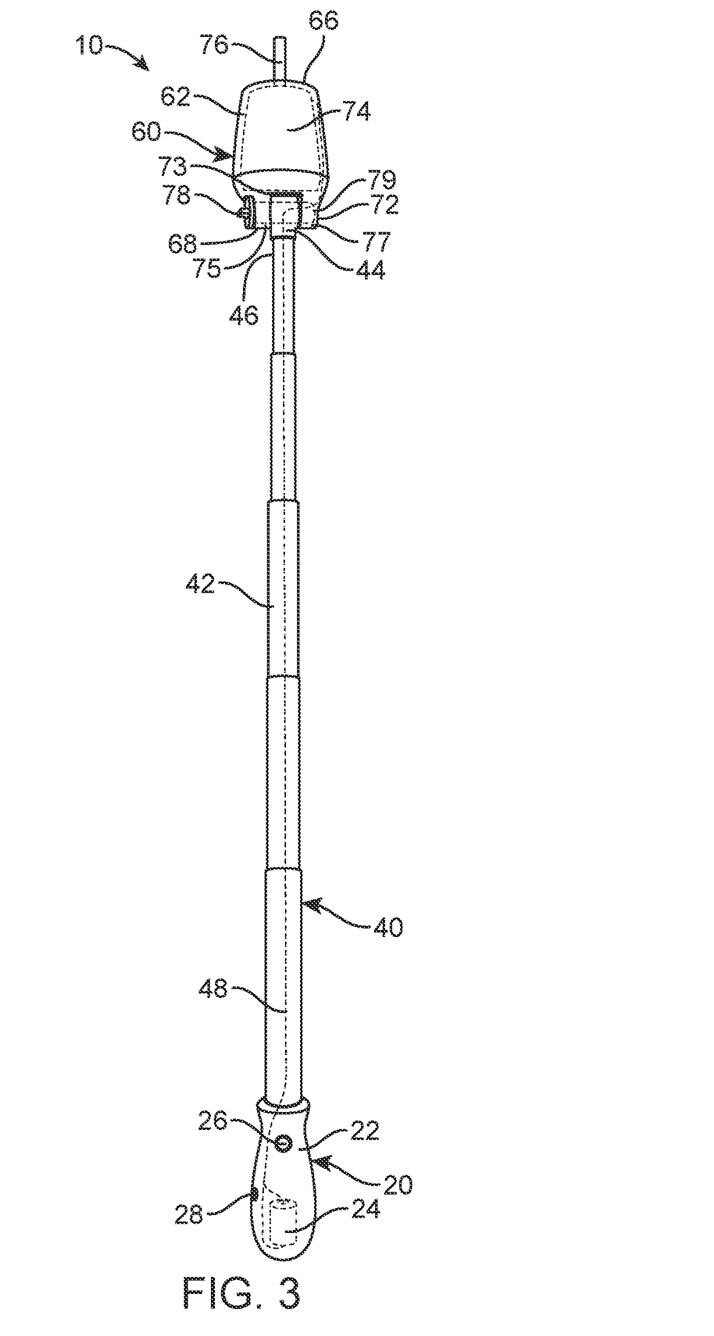
FIG. 3 illustrates an isometric view of the motorized multi-function tool 10 in an extended configuration.

Motorized multi-function tool 10 may be used to accomplish various and different tasks with one same tool by having interchangeable tool heads. Motorized multi-function tool 10 includes handle assembly 20. Handle assembly 20 includes a handle 22 which may be adapted to allow a user U to grasp handle 22 and operate or maneuver the present invention. Handle 22 may be of a predetermined shape that is ergonomic for comfortably receiving a hand of user U. Handle 22 may be made of plastic, rubber, or virtually any other material. Housed in handle 22 may be a battery 24 for providing power to various components of the present invention. Preferably, battery 24 may be rechargeable. In one embodiment, battery 24 may be removable for purposes of recharging or replacing of battery 24. It may be suitable for handle assembly 20 to include a charging port 28 on handle 22 to allow for recharging of battery 22. Further included in handle assembly 20 may be a power button 26 to actuate a motor 74 located within cover assembly 60. Power button 26 may be operated to turn on and off components of the present invention.

Motorized multi-function tool 10 may include rod assembly 40 mounted on handle assembly 20. Rod assembly 40 may be used to allow extending or retracting of the present invention to reach different heights to accomplish different tasks or needs. Rod assembly 40 may include a shaft 42. In one embodiment, shaft 42 may be telescopic. Shaft 42 may extend or retract to lengthen or shorten the present invention to be able to reach a desired height or distance. Shaft 42 being telescopic may allow for user U to use and operate the present invention even with limited mobility. Shaft 42 may be of predetermined dimensions. In one embodiment, shaft 42 may be cylindrical. However, it should be understood that any shape may be suitable for shaft 42. Shaft 42 may preferably be made of aluminum or stainless steel as to be durable yet lightweight, but any other material may be suitable. Shaft 42 may include a male member 44 extending from a top end 46 of shaft 42. Male member 44 may be open on both lateral sides. Extending through shaft 42 may be a power cable 48 which connects to battery 24 on one end and to motor 74 on an opposite end. Power cable 48 allows for power from battery 24 to reach motor 74 in order for motor 74 to operate. In an alternate embodiment, motor 74 may vibrate or shake when needed by user U. The vibration may aid in the usage of certain tools with the present invention, preferably with tools intended for health and beauty purposes.

Figure 4:
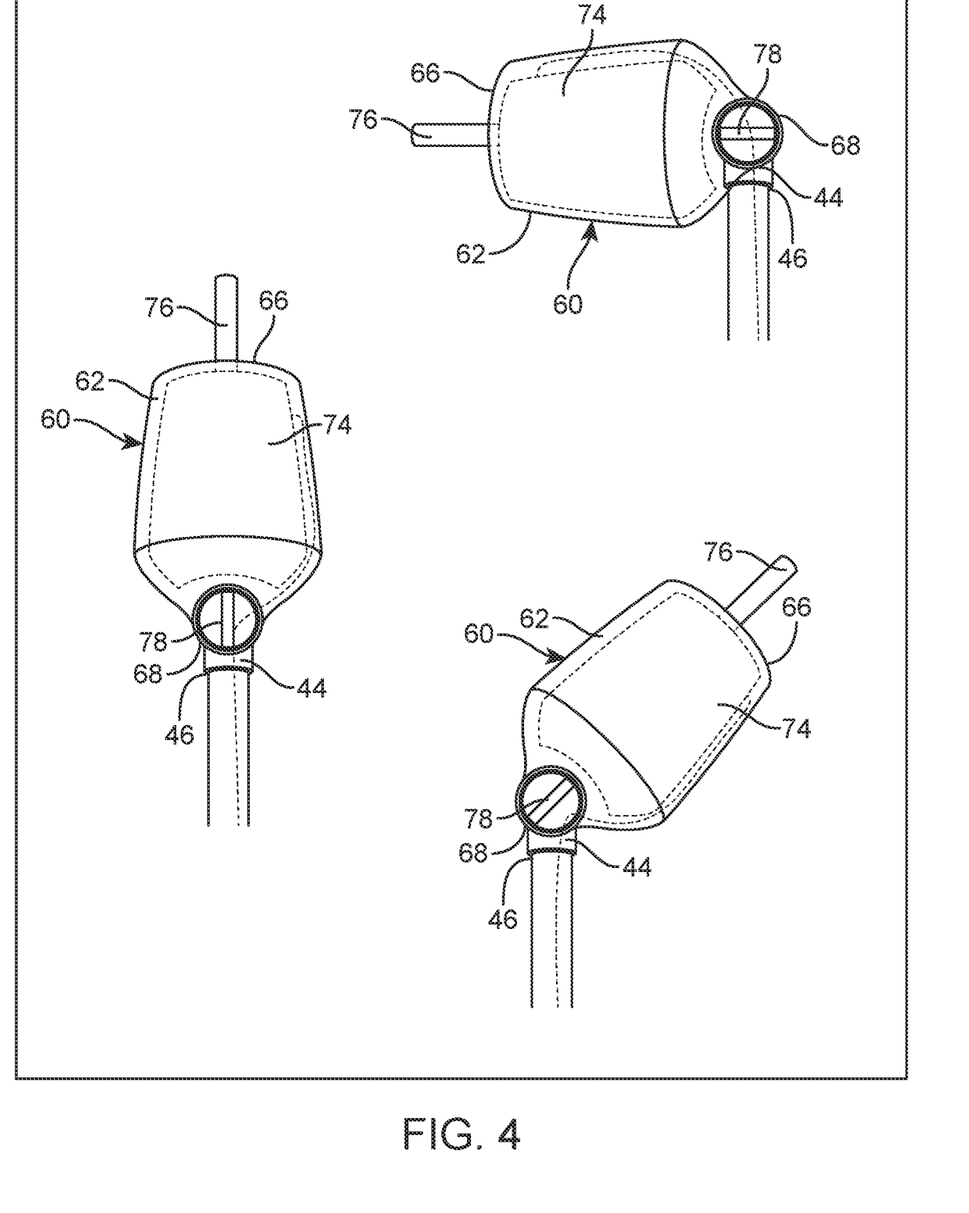
FIG. 4 shows how the cover assembly 60 can be positioned or angled differently to help accomplish tasks that may require inconvenient working angles.
Figure 8:
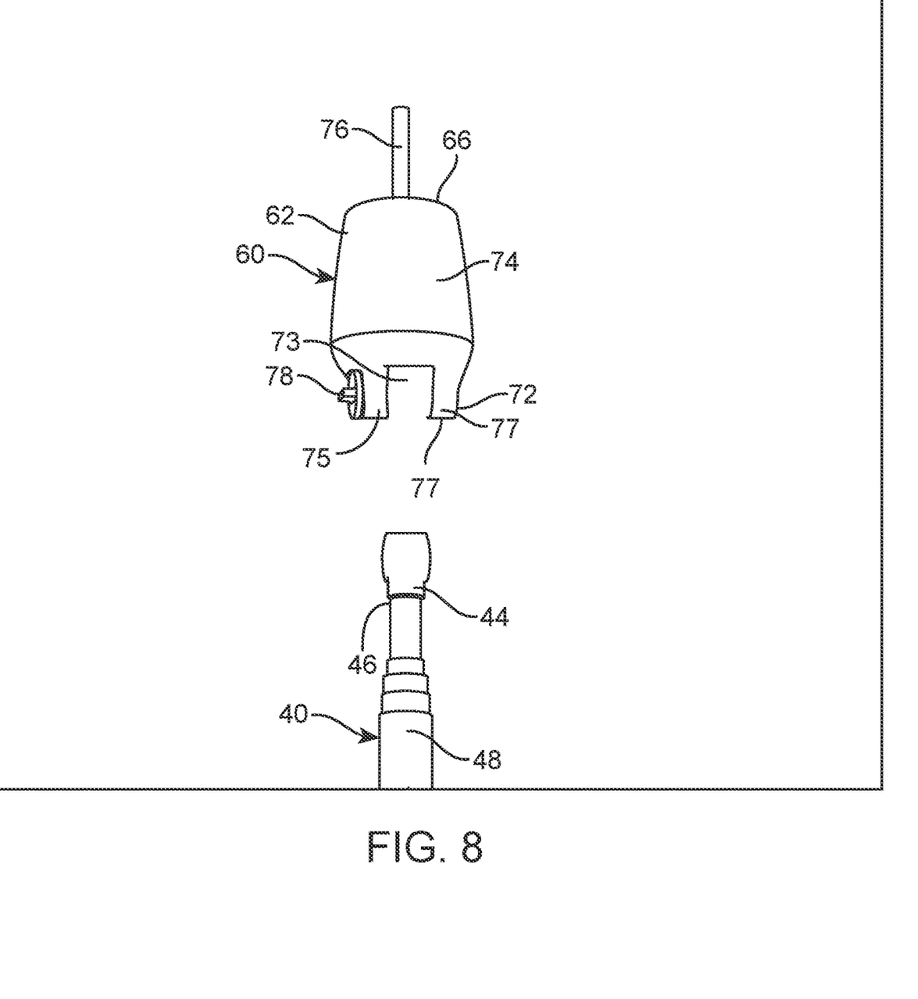
FIG. 8 shows the rod assembly 40 and the cover assembly 60 separated.

The present invention may further include cover assembly 60 mounted to rod assembly 40. Rod assembly 40 and cover assembly 60 may be seen before mounting together in FIG. 8. Cover assembly 60 may importantly include a head 62. Head 62 may have an opening at a first end 66 of head 62 leading to an interior of head 62. Head 62 may further include a second end 68 at which a female member 72 may be mounted to. In one embodiment, head 62 may be tapered. Female member 72 may include a female opening 73 defined as the space therebetween a first female side 75 and a second female side 77. Each of first female side 75 and second female side 77 may be entirely open on lateral sides. Female member 72 may receive male member 44 within female opening 73. Once male member 44 has been received within female member 72, a fastener 79 may extend perpendicularly to male member 44 and female member 72. Male member 44 and female member 72 are held and secured together by fastener 79 which extends through the lateral openings of male member 44 and female member 72. At one end of fastener 79 may be a tightening knob 78 mounted thereon. Tightening knob 78 may be an outwardly protruding knob that allows for positioning of head 62 relative to shaft 42. In order to allow for positioning of head 62 tightening knob may be rotated in a predetermined direction that loosens male member 44 and female member 72. Once tightening knob 78 has been loosened a sufficient amount, head 62 may freely move into position. Tightening knob 78 may also be adapted to receive fingers of user U to rotatably move and position head 62 as desired by user U. With male member 44 and female member 72 being secured together, head 62 may still be movable. Once the desired position of head 62 has been achieved, then tightening knob 78 may be rotated in a predetermined direction that tightens and secures head 62 into the desired position. Once tightening knob 78 has been fully tightened then head 62 may no longer freely move. Importantly extending from motor 74 may be an axle 76. Axle 76 may be of predetermined dimensions. Axle 76 may be adapted to receive tools or heads from interchangeable tool assembly 80. Axle 76 may be actuated upon motor 74 being actuated. In one embodiment, axle 76 may freely rotate as motor 74 is being powered by battery 24. Motor 74 may be housed within head 62. In one embodiment, motor 74 may be housed within head 62 through the opening at first end 66. Axle 76 may protrude and extend from head 62. Axle 76 may further receive an attaching portion 94 of interchangeable tool assembly 80. Attaching portion 94 may be fully received by and within axle 76. Attaching portion 94 aids in securing a tool from interchangeable tool assembly 80 to axle 76.

Figure 5:
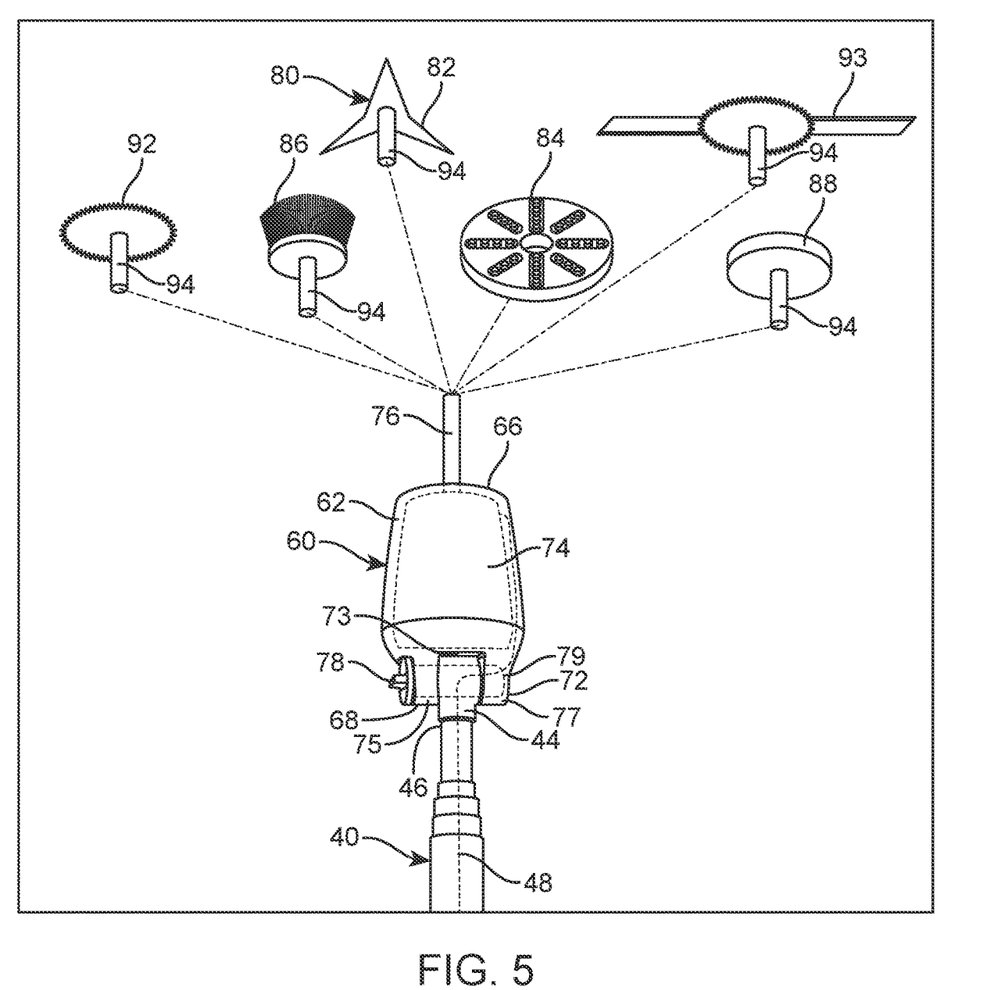
FIG. 5 is a representation of the tool heads 81 of the interchangeable tool assembly 80.
Figure 6:
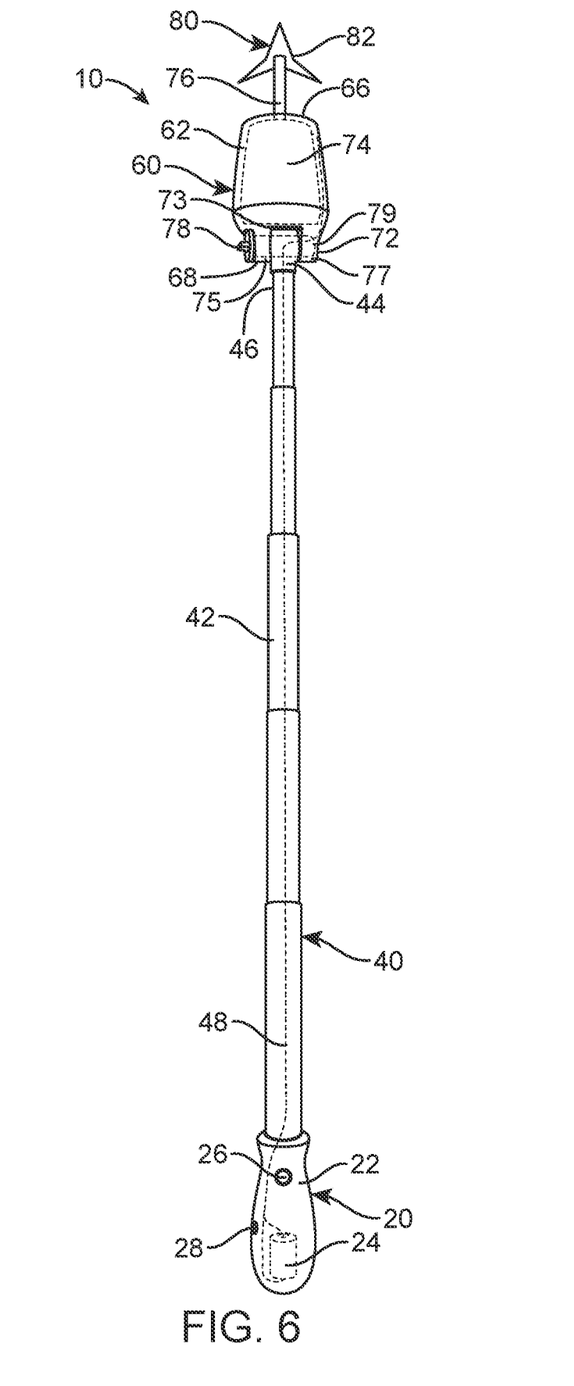
FIG. 6 shows one of the tool heads 81, the triangular cutter tool 82, mounted to the present invention.

Mounted to motor 74 and more specifically to axle 76 may importantly be interchangeable tool assembly 80 as seen in FIG. 5. Interchangeable tool assembly 80 may include different tool heads 81 to be used to accomplish different tasks with one same tool. Interchangeable tool assembly 80 may include tool heads 81 which are one of a triangular cutter tool 82, a vacuum tool 84, a brush tool 86, a buffer tool 88, a round cutter tool 92, and a twin blade cutter tool 93. It may be appreciated and understood that tool heads beyond those disclosed may be suitable to use with the present invention. Each of the aforementioned tools may include attaching portion 94 for securing the tools to axle 76. In one embodiment, triangular cutter tool 82 may include three triangular blades for ease of cutting items such as branches, for example. In one embodiment, vacuum tool 84 may be circular shaped. Vacuum tool 84 may be actuated to clean up and suction debris or dirt. Vacuum tool 84 may further include small bristles for dislodging debris for ease of suctioning afterwards. The small bristles of vacuum tool 84 may be oriented in a star like configuration. Brush tool 86 may include a plurality of bristles thereon for cleaning or the like of surfaces. In one embodiment, brush tool 86 may be preferably circular shaped. In one embodiment, buffer tool 88 may preferably be circular and used to polish a surface or the like. Round cutter tool 92 may be adapted cut. Round cutter tool 92 may include a plurality of blades along an outer circumference. Twin blade cutter tool 93 may include a circular disk with blades protruding along an outer circumference. Twin blade cutter tool 92 may also include twin blades extending from the circular disk. Each of the twin blades may be sharp only on one side. The twin blades are oriented opposite to one another so that the sharp side of each of the twin blades face opposite to one another. As user U needs different and at times various tools to accomplish a task. Any of triangular cutter tool 82, vacuum tool 84, brush tool 86, buffer tool 88, round cutter tool 92 or twin blade cutter tool 93 may be attached and later removed from axle 76. For example, if user U needs to make cuts to a wooden surface, user U may attach triangular cutter tool 82 to axle 76 for cutting. Once all cutting has been completed, user U may detach triangular cutter tool 82 and replace it with vacuum tool 84 for cleaning up of debris that resulted from cutting with triangular cutter tool 82. It should be understood that tools beyond those described may be suitable to use with the present invention.

Figure 7:
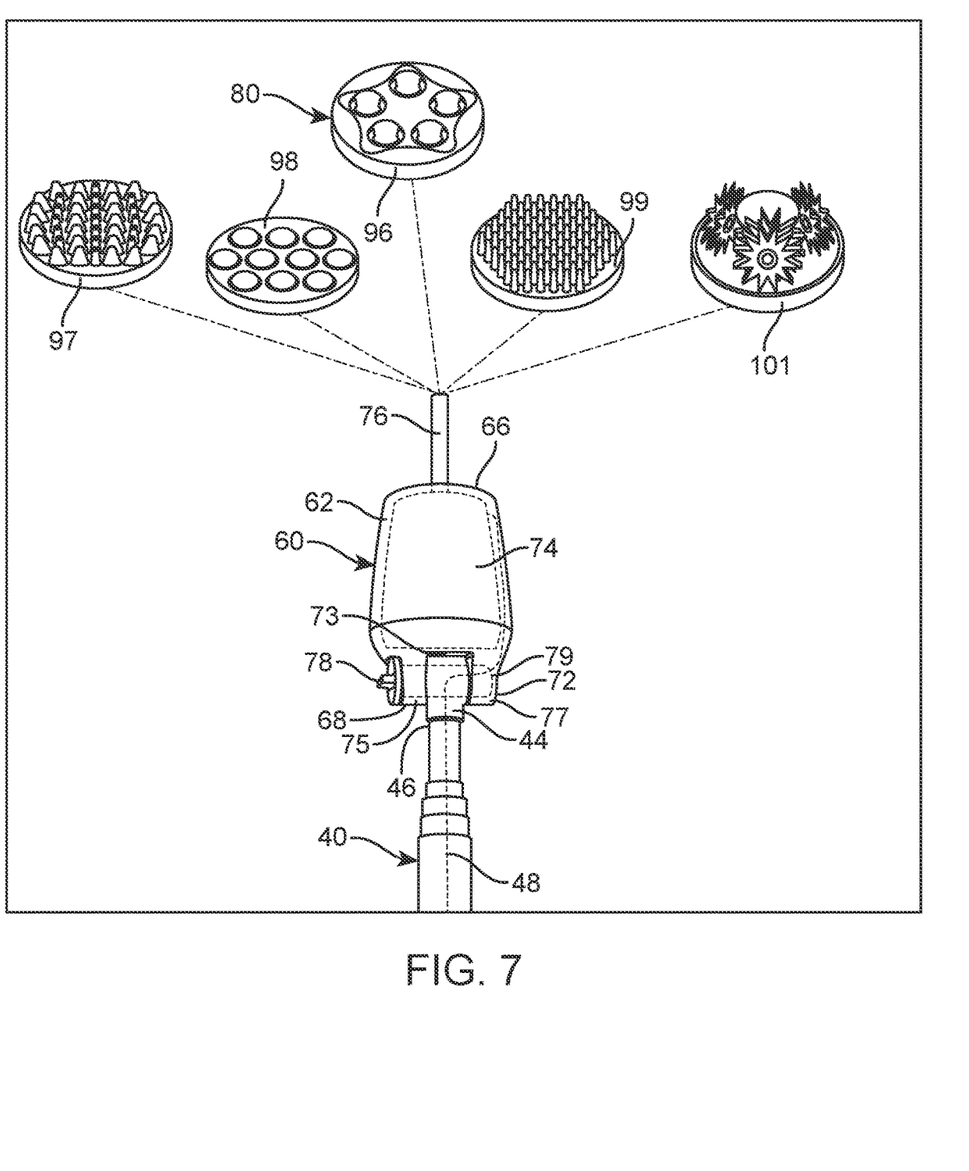
FIG. 7 illustrates additional interchangeable heads, beauty tool heads 95, of the present invention that may be used for health care and beauty care purposes of a user.

Referring to FIG. 7 it can be seen that the present invention may further include beauty tool heads 95 that may be used for health or cosmetic purposes. Beauty tool heads 95 depicted help user U may take care of aesthetic, cosmetic or beauty concerns. Beauty tool heads 95 may further aid user U address their wellbeing or health needs and concerns. The following beauty tool heads 95 may provide muscle relief to the user or help to improve blood circulation in user U. Beauty tool heads 95 may further be used for relaxation and massages for user U. Additionally, beauty tool heads 95 described may help with cellulite, spider veins, redness, varicose veins, or other skin concerns. It may be suitable to also exfoliate the skin of user U with beauty tool heads 95. It can be seen that beauty tool heads 95 include a ball head 96, a large spikes head 97, a massage head 98, a small spikes head 99 and a rolling spikes head 101. Each of beauty tool heads 95 may be interchangeable and removably be mounted to motor 94. It may be suitable for motor 94 to vibrate or shake, in one embodiment. The vibrations of motor 94 may allow for treatments with beauty tool heads 95 to be more effective. Ball head 96 may include a plurality of balls that may roll in place during usage. Large spikes head 97 and small spikes head 99 may include a plurality of protruding spikes that may be used to relieve pain or pressure. The spikes may be used to hit tension points in muscles for relief. Massage head 98 may include a plurality of rounded bumps or protrusions that may be used to massage the muscles or scalp of user U. Rolling spikes head 101 may include a plurality of spikes that are pointy and rotate. This may help to relieve muscles of user U. It should be understood that beauty tool heads 95 may include additional beauty tools that may aid in increasing or improving the wellness and beauty of user U.

Figure 9:
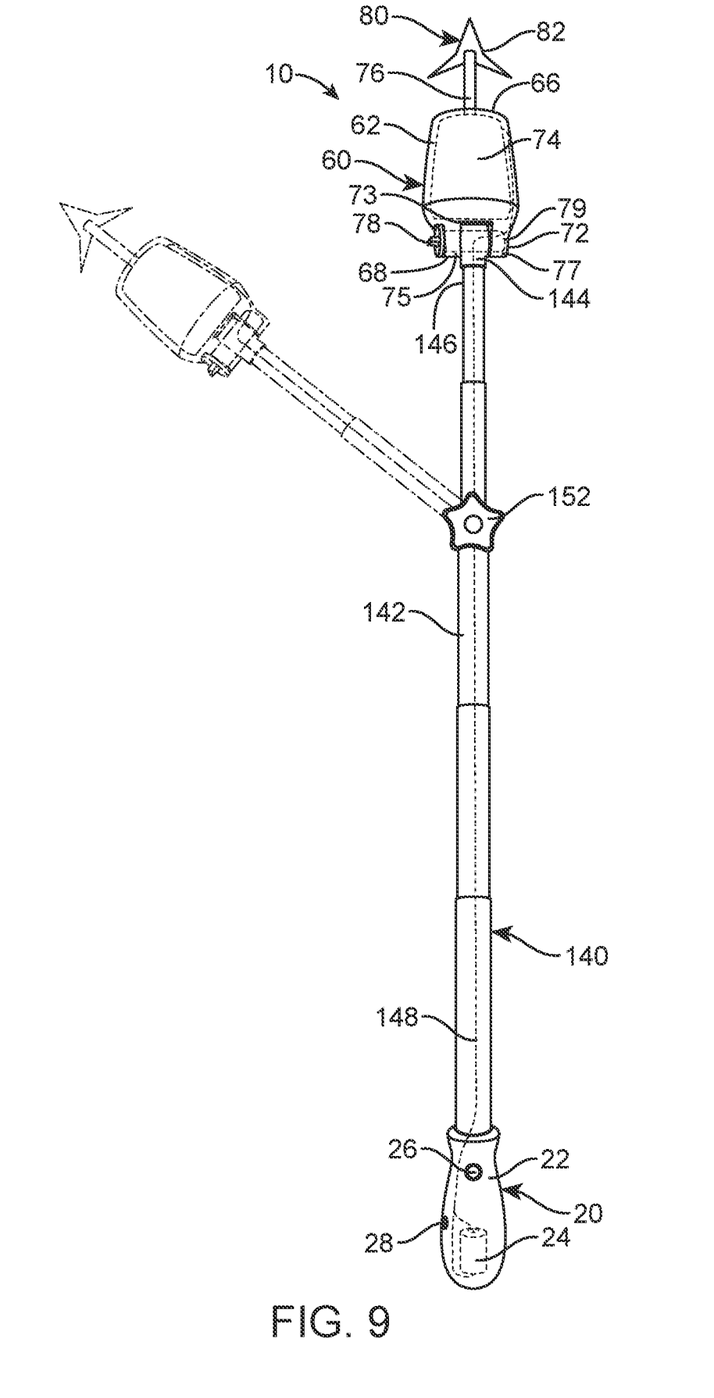
FIG. 9 represents an alternate embodiment of the shaft assembly 140, wherein the shaft 142 includes a pivot knob 152 that allows the shaft 142 to swivel or to be articulated about the location of the pivot knob 152 allowing the present invention to reach laterally and hard to reach areas.

In an alternate embodiment, as seen in FIG. 9, the present invention may include a shaft assembly 140. Shaft assembly 140 may include a shaft 142 having a male member 144 at a top end 146. Further shaft assembly 140 may include a power cable 148 running through shaft 142. Shaft 142 may extend between handle 22 and head 62. It may be suitable for shaft 142 to be telescopic. Importantly, shaft 142 may include a pivot knob 152. Pivot knob 152 may be at a predetermined location on shaft 142. Pivot knob 152 allows shaft 142 to swivel or pivot about pivot knob 152. Shaft 142 may be articulated about pivot knob 152 to help reach more or difficult to access locations. Pivot knob 152 may allow for reaching of areas laterally. Pivot knob 152 may be loosened until shaft 142 is at a desired angle. Subsequently, pivot knob 152 may be tightened to secure the angled position of shaft 142 to allow reaching of areas that are vertical and horizontal as well. Pivot knob 152 allows for a bend or break on shaft 142.

Figure 10:
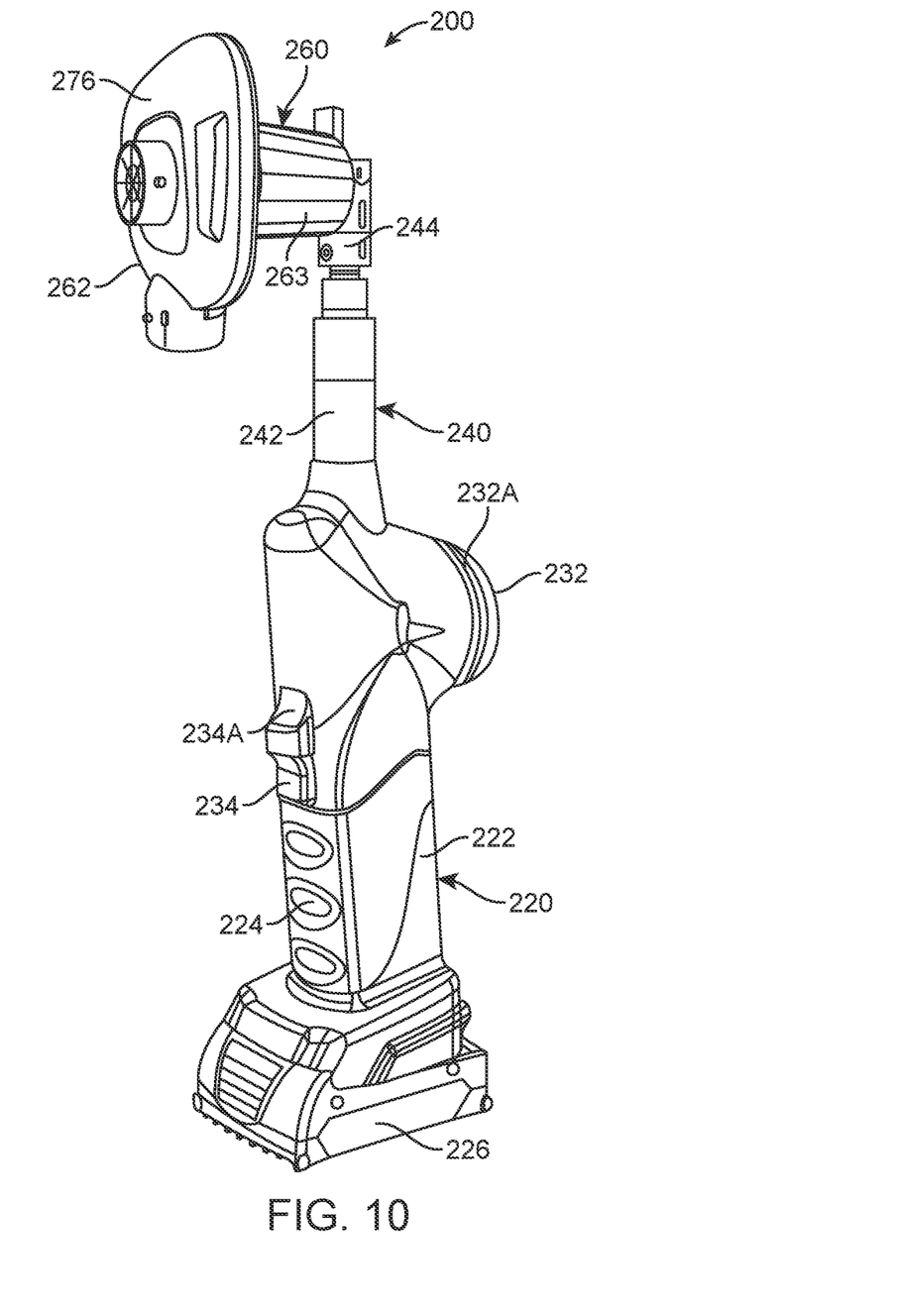
FIG. 10 shows an isometric front view of motorized multi-function tool 200 with one of tool heads 262 from interchangeable head assembly 260, in accordance with an embodiment of the present invention.
Figure 11:
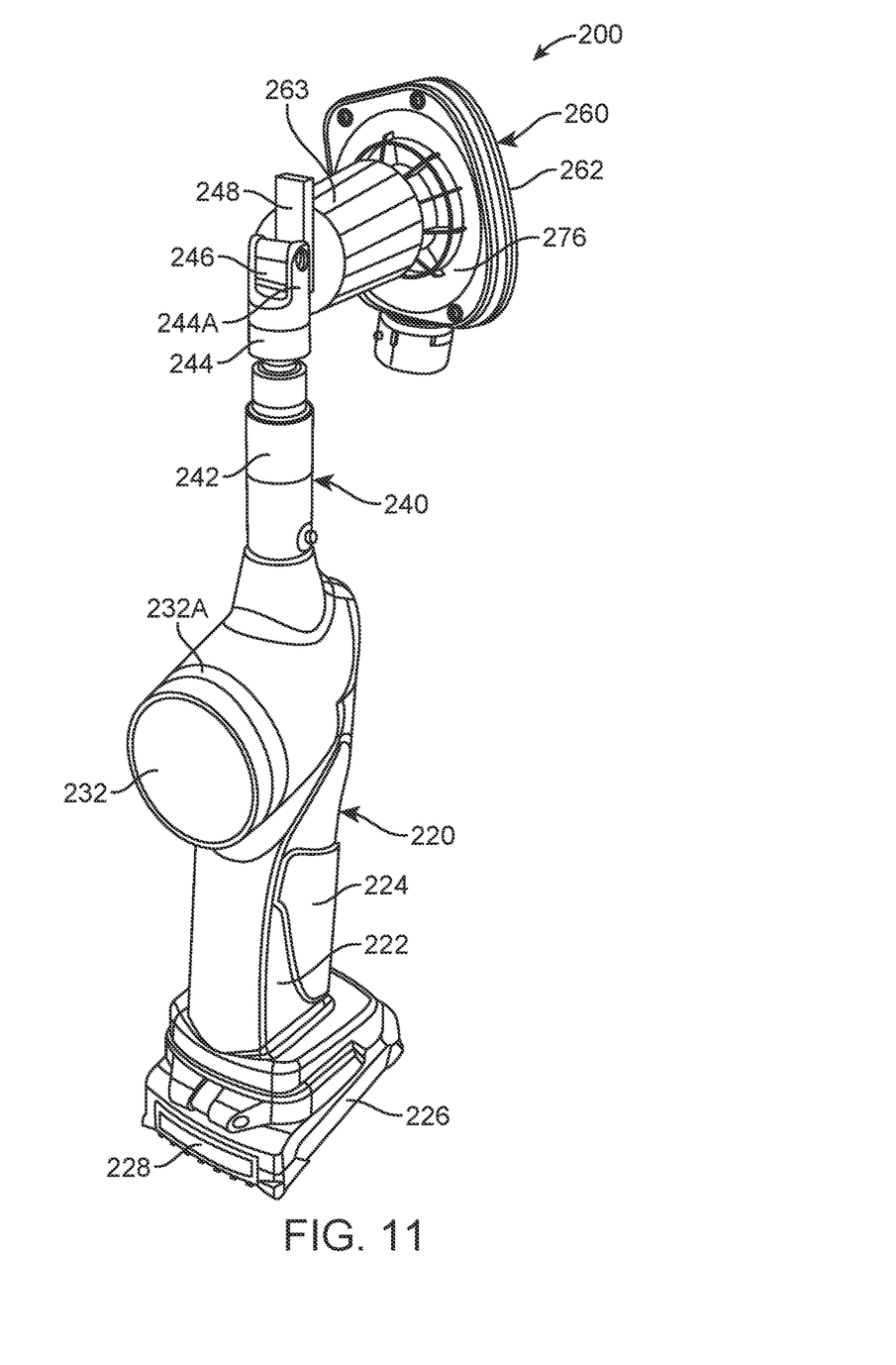
FIG. 11 represents an isometric rear view of motorized multi-function tool 200 with one of tool heads 262 from interchangeable head assembly 260, in accordance with an embodiment of the present invention.
Figure 12:
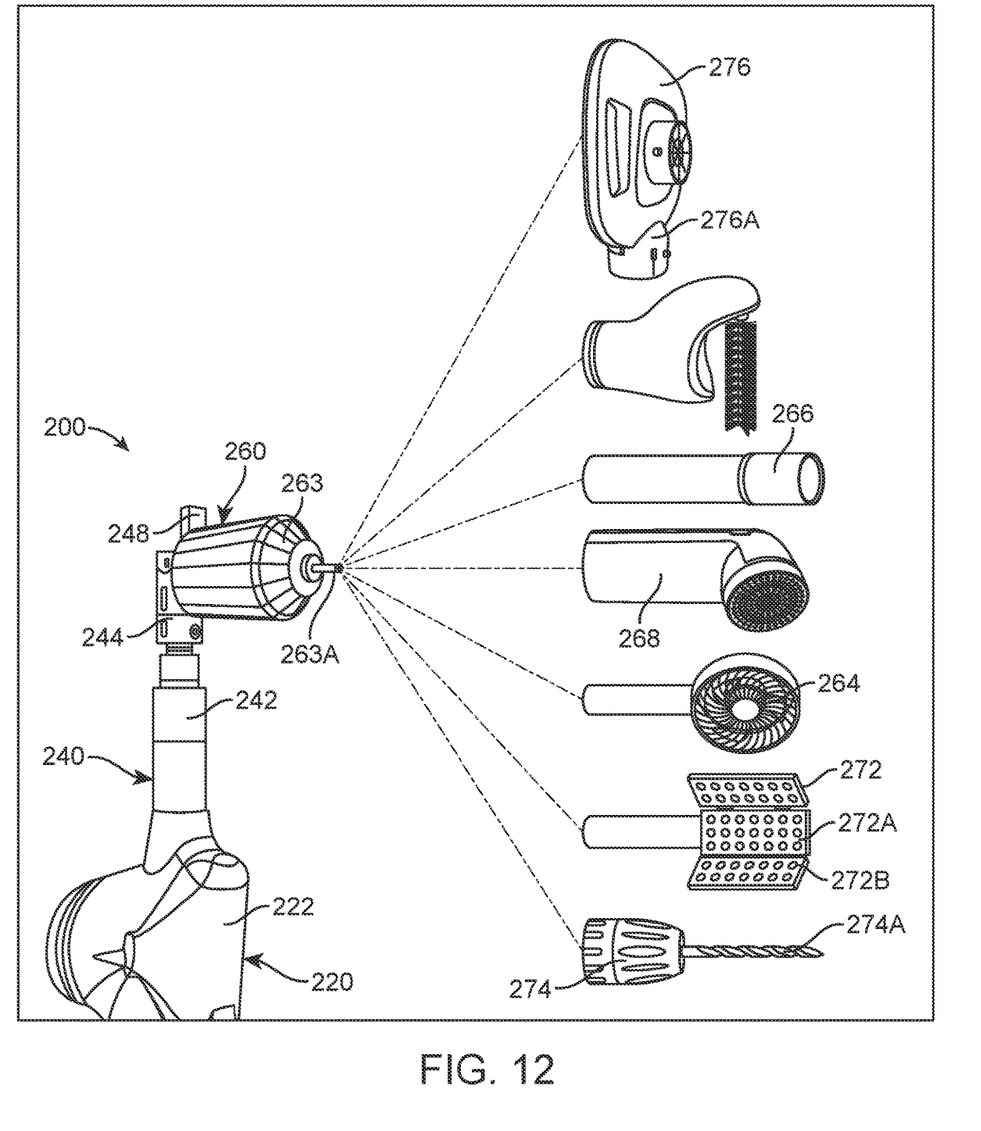
FIG. 12 illustrates the multiple tool heads 262 of interchangeable head assembly 260 that may be removably attached to motorized multi-function tool 200.

In an alternate embodiment, a motorized multi-function tool 200, as best illustrated in FIGS. 10-12, may include a handle assembly 220, a rod assembly 240 and an interchangeable head assembly 260. Handle assembly 220 may include a handle 222. Handle 222 may have an ergonomic configuration that allows users to easily grip and maneuver motorized multi-function tool 200. Handle 222 may be substantially rectangular. Handle 222 may be made of materials such as plastic, rubber, aluminum or the like. Preferably, the present invention may be made of lightweight materials to facilitate operation and maneuvering thereof. Handle 222 may include a grip portion 224 for added comfort to the user. Grip portion 224 may include recessed portions to ergonomically accommodate the fingers of the user thereon. It may be suitable for grip portion 224 to be made of materials such as rubber to provide added gripping to prevent accidental dropping of the present invention. It may alternatively be suitable for grip portion 224 to be made of an absorbent material to facilitate the concern of sweaty palms during operation of the present invention. It may be suitable for handle 222 to be partially covered by grip portion 224. It can be seen that grip portion 224 is tapered from a front face of handle 222 towards a rear face of handle 222.

Removably attached to the bottom distal end of handle 222 may be a battery 226. Battery 226 may be slidably secured to handle 222. It may be suitable for battery 226 to be rechargeable. It can be seen that battery 226 may have a width greater than that of handle 222. It can be seen that battery 226, in one embodiment, may have a downward slope from a rear side to a front side thereof. It may be suitable for battery 226 to include connectors that permit battery 226 to connect to a charging station for recharging of battery 226. Alternatively, battery 226 may include a charging port to recharge battery 226. It may also be suitable for battery 226 to include a battery indicator 228. Battery indicator 228 may indicate of the remaining charge of battery 226. Battery indicator 228 may be a plurality arranged together lights indicating the remaining battery life of battery 226. It may be suitable for battery indicator 228 to be green lights indicating a sufficient charge, the green lights may turn to red lights as they battery life of battery 226 is drained. In one implementation, battery indicator 228 may be located on a rear of battery 226. It is to be understood that battery 226 may be electronically in communication with rod assembly 240 and interchangeable head assembly 260 to provide power and energy thereto. In one embodiment, it may be suitable for battery 226 to have a charging port used to provide charge and power from battery 226 to external electronic devices connected to battery 226, such as mobile devices. A charging wire may be used to connect the external electronic devices to battery 226.

Secured to the rear of handle 222 may be a screen 232. Screen 232 may an interactive touch screen, in one embodiment. It may be suitable for screen 232 to indicate information of the present invention such as temperature, battery life, moving speed of interchangeable head assembly 260 or the like. It may be suitable for screen 232 to include a selection ring 232A. Selection ring 232A may be rotatably secured to the perimeter of screen 232. Users may spin selection ring 232 until the desired data is displayed on screen 232. It is to be understood that preferably, screen 232 may be secured to the rear face of handle 222 above of grip portion 224.

Additionally, secured to handle 222, may be a power switch 234. Power switch 234 may be actuated to power on the present invention. Power switch 234 may allow turning on and off of motorized multi-function tool 200. It may be suitable for power switch 234 to be a button in an alternate embodiment. In one embodiment, a protective cover 234A may be secured to handle 222 partially covering power switch 234 to prevent accidental actuation thereof. Protective cover 234A may have a tapered configuration. Protective cover 234A may be atop of power switch 234 such that a top portion of power switch 234 is covered to help prevent accidental powering on of the present invention.

Secured atop of handle 222 may be rod assembly 240. Rod assembly 240 may include a rod 242. It may be suitable for rod 242 to be telescopic, in one embodiment. Thereby facilitating reaching of difficult to reach spaces or heights. It may be suitable for rod 242 to expand or retract via automatic or manual means. It is to be understood that rod 242 may taper the longer rod 242 gets and decrease in width. Secured to a top distal end of rod 242 may be a support member 244. Support member 244 may help interchangeable head assembly 260 to be securely be attached and supported on rod 242. Support member 244 may have a substantially cylindrical configuration. It can be seen that atop of support member 244 may be support arms 244A extending therefrom. It may be suitable for support arms 244A to be oblong with a domed top distal end. Support arms 244A may be parallel to each other on support member 244. Located and secured between support arms 244A may be an attachment member 246. Attachment member 246 may be rotatably received within support arms 244A. Attachment member 246 may be locked into a desired position to angle interchangeable head assembly 260 as needed. Secured onto attachment member 246 may be a grasping member 248. Grasping member 248 may have a rectangular configuration and overextend beyond attachment member 246. Grasping member 248 may be used engaged by the user to rotate attachment member 246 to position attachment member 246 as needed to make proper use of interchangeable head assembly 260. Tool heads 262 of interchangeable head assembly 260 may be supported on grasping member 248. Grasping member 248 may include a securing axle to receive certain of tool heads 262 thereon not requiring motor power.

It is to be understood that detachably secured to rod 242, more specifically, onto grasping member 248 may be interchangeable head assembly 260. Interchangeable head assembly 260 may include tool heads 262. Tools heads 262 may each help to achieve a different task such as sanitizing, cleaning, refreshing, illuminating or the like. Tool heads 262 may receive power from battery 226. Each of tool heads 262 may be removably secured atop of handle 222. Some of tool heads 262 may include a shaft to allow grasping of the tool. Additionally, the shaft may help to facilitate securing of the tool heads 262 to the present invention. It may be suitable for some of tool heads 262 to include a motor 263 attached for proper function thereof. It to be understood that motor 263 may be electrically connected to battery 226. Motor 263 may include a motor axle 263 to receive the selected of tool heads 262 for attachment to handle 222. Other of tool heads 262 not requiring motor 263 may be attached to motor 263 while motor 263 remains idle. In an alternative embodiment, it may be suitable for each of tool heads 262 to include an individual of motor 263 within for functioning if motor 263 is required for the functioning of certain of tool heads 262. Motor 263 may be exposed for some of tool heads 263 requiring motor 263 for functioning. One of tool heads 262 may be a fan 264. Fan 264 may emit air to allow a user to achieve comfort in hot temperatures. Fan 264 may include motor 263 internally, in one embodiment. Fan 264 may include blades which rotate to emit air. It may be suitable for fan 264 to include a cover over the blades to prevent accidental contact of blades during operation of fan 264. Another of tool heads 262 may be a flashlight 266 which may emit light to illuminate a desired area. Another of tool heads 262 may be a lint remover 268. It may be suitable for lint remover 268 to include motor 263 internally, in one embodiment. Lint remover 268 may include blades within to help remove lint from articles of clothing and a cover grill to prevent accidental touching of the blades. The blades may spin to cut the lint loose from the fabric. It may also be suitable for the fabric to be collected within lint remover 268. Another of tool heads 262 may be an ultraviolet (UV) sanitation tool 272. UV sanitation tool 272 may include folding panels 272A which are hingedly mounted together. Folding panels 272A may be unfolded and enclosed about an object needing sanitation. On each of folding panels 272A may be located ultraviolet (UV) lights 272B. UV lights 272B may be arranged in parallel columns along the length of folding panels 272A. UV lights 272B may emit one of UV-A, UV-B, or UV-C radiation to kill bacteria on surfaces. Another of tool heads 262 may be a drill attachment 274. It may be suitable for a drill bit 274A to be attached to drill attachment 274 for proper drilling. It is to be understood that attached to drill attachment 274 may be motor 263 to help rotation of drill bit 274A. Yet another of tool heads 262 may be a blower 276. Blower 276 may blow air to inflate objects. It may be suitable for blower 276 to include an air pump within to generate air. It may be suitable for blower 276 to emit air for cleaning outdoor areas or the like. It may be suitable for blower 276 to include an air release portion 276A from which air may be emitted. It may be suitable to control the speed and power of the air being generated. With tool heads 262 users are able to accomplish various tasks with one same tool that can be adapted to provide a solution in a variety of situations and circumstances.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a motorized multi-function tool, comprising:
   a. a handle assembly having a handle with a battery removably attached thereto, said handle further having a power switch selectively actuated to power on said battery wherein said battery is rechargeable and includes a battery indicator displaying the remaining battery life of said battery during usage, wherein said handle further includes a screen, a protective cover, and a grip portion secured thereon, said screen having a selection ring extending about an entire perimeter thereof, said selection ring being rotatable about said screen, wherein said screen has a circular shape, said screen protrudes outwardly from a top portion of said handle, said grip portion extending from a front face of said handle towards a rear face of said handle and is tapered, wherein said protective cover partially concealing said power switch, said protective cover being entirely above of said grip portion;
   b. a rod assembly having a rod secured onto said handle, said rod including a grasping member at a top end thereof; and
   c. an interchangeable tool assembly including tool heads, one of said tool heads being mounted onto said grasping member, said tool heads being powered by said battery to complete a desired task with said interchangeable tool assembly, said tool heads being positioned as desired with said grasping member, wherein said tool heads are one of a fan, a flash light, a lint remover, an ultraviolet (UV) sanitation tool, a drill attachment, and a blower.

2. The system of claim 1, wherein said rod is telescopic, said rod including a support member at a top distal end thereof, said support member including support arms extending vertically therefrom.

3. The system of claim 2, wherein secured to said support member is an attachment member, attachment member being secured within said support arms and being rotatable, said grasping member being secured to said attachment member.

4. The system of claim 1, wherein a motor is selective attached to said grasping member, said motor being electrically connected to said battery, said motor further including a motor axle to receive selected of said tool heads.

5. The system of claim 1, wherein said fan, said lint remover, or said drill attachment are connected to a motor for proper functioning thereof.

6. The system of claim 1, wherein said ultraviolet sanitation tool includes folding panels hingedly attached together, each of said folding panels including a plurality of ultraviolet lights thereon, said drill attachment including a drill bit attached thereto, said blower including an air release portion from which air is emitted therefrom.

7. A system for a motorized multi-function tool, consisting of:
   a. a handle assembly having a handle with a battery removably attached thereto, said handle further having a power switch selectively actuated to power on said battery, wherein said battery is rechargeable and includes a battery indicator displaying the remaining battery life of said battery during usage, wherein said handle further includes a screen, a protective cover, and a grip portion secured thereon, said screen having a selection rings extending about an entire perimeter thereof, said selection ring being rotatable about said screen, wherein said screen has a circular shape, said screen protrudes outwardly from a top portion of said handle, said grip portion extending from a front face of said handle towards a rear face of said handle and is tapered, wherein said protective cover partially concealing said power switch, said protective cover being entirely above of said grip portion;
   b. a rod assembly having a rod secured onto said handle, said rod including a grasping member at a top end thereof, wherein said handle has a bigger diameter than a diameter of said rod, wherein said rod slants forward having a frustoconical shape, said rod including a support member at a top distal end thereof, said support member including support arms extending vertically therefrom, wherein secured to said support member is an attachment member, attachment member being secured within said support arms and being rotatable, said grasping member being secured to said attachment member; and
   c. an interchangeable tool assembly including tool heads, one of said tool heads being mounted onto said grasping member, said tool heads being powered by said battery to complete a desired task with said interchangeable tool assembly, said tool heads being positioned as desired with said grasping member, wherein said tool heads are one of a fan, a flashlight, a lint remover, an ultraviolet (UV) sanitation tool, a drill attachment, and a blower; wherein said fan, said lint remover, and said drill attachment are connected to a motor for proper functioning thereof, wherein said ultraviolet sanitation tool includes folding panels hingedly attached together, each of said folding panels including a plurality of ultraviolet lights thereon, said drill attachment including a drill bit attached thereto, said blower including an air release portion from which air is emitted therefrom.

* * * * *